US011372228B1

(12) United States Patent
Davis et al.

(10) Patent No.: US 11,372,228 B1
(45) Date of Patent: Jun. 28, 2022

(54) REDUCING LOST MOTION IN ADJUSTMENT KNOBS FOR RIFLESCOPES AND OTHER MECHANICALLY ADJUSTABLE DEVICES

(71) Applicant: Leupold & Stevens, Inc., Beaverton, OR (US)

(72) Inventors: Matthew C. Davis, Hillsboro, OR (US); Gabriel Isaac Applekamp, Forest Grove, OR (US)

(73) Assignee: Leupold & Stevens, Inc., Beaverton, OR (US)

( * ) Notice: Subject to any disclaimer, the term of this patent is extended or adjusted under 35 U.S.C. 154(b) by 328 days.

(21) Appl. No.: 16/785,395

(22) Filed: Feb. 7, 2020

Related U.S. Application Data

(60) Provisional application No. 62/802,300, filed on Feb. 7, 2019.

(51) Int. Cl.
*F41G 1/38* (2006.01)
*G02B 23/00* (2006.01)

(52) U.S. Cl.
CPC ............... *G02B 23/00* (2013.01); *F41G 1/38* (2013.01)

(58) Field of Classification Search
CPC ............ F41G 1/38; G02B 23/00; G02B 7/023
See application file for complete search history.

(56) References Cited

U.S. PATENT DOCUMENTS

| | | | |
|---|---|---|---|
| 2,578,130 A * | 12/1951 | Ford | F41G 1/38 403/90 |
| 6,691,447 B1 | 2/2004 | Otteman | |
| 9,170,068 B2 | 10/2015 | Crispin | |
| 9,354,438 B2 | 5/2016 | Ingenito et al. | |
| 10,724,829 B1 * | 7/2020 | Ding | F41G 1/545 |
| 11,243,049 B1 * | 2/2022 | Enzinger | G02B 27/36 |
| 2008/0236018 A1 * | 10/2008 | Halverson | F41G 1/16 42/135 |
| 2013/0167425 A1 * | 7/2013 | Crispin | F41G 1/16 42/119 |
| 2014/0196351 A1 * | 7/2014 | Campean | G05G 1/082 74/504 |
| 2015/0070758 A1 * | 3/2015 | Ingenito | G02B 23/16 359/399 |
| 2015/0153138 A1 * | 6/2015 | Presley | F41G 1/38 42/122 |
| 2018/0313633 A1 * | 11/2018 | Delz | G02B 23/14 |
| 2019/0128642 A1 | 5/2019 | Davis et al. | |
| 2019/0376765 A1 * | 12/2019 | Hamilton | G02B 7/023 |
| 2020/0232763 A1 | 7/2020 | Sheets, Jr. | |

* cited by examiner

*Primary Examiner* — Gabriel J. Klein
(74) *Attorney, Agent, or Firm* — Stoel Rives LLP

(57) ABSTRACT

A rotatable adjustment device for a riflescope or other optical device includes a drive screw that is threadably coupled to a rotating spindle and constrained so that the drive screw translates along the axis of rotation of the spindle. The adjustment device further includes a stop screw that also translates along the axis in response to rotation of the spindle until the stop screw contacts an adjustment stop to limit further rotation of the spindle in the first rotational direction. Lost motion is reduced or avoided by a compliant gap between the drive screw and stop screw.

19 Claims, 10 Drawing Sheets

US 11,372,228 B1

REDUCING LOST MOTION IN ADJUSTMENT KNOBS FOR RIFLESCOPES AND OTHER MECHANICALLY ADJUSTABLE DEVICES

RELATED APPLICATIONS

This application claims the benefit under 35 U.S.C. 119(e) from U.S. Provisional Patent Application No. 62/802,300, filed Feb. 7, 2019, which is incorporated herein by reference.

TECHNICAL FIELD

The field of the disclosure relates to adjustment knobs and rotatable adjustment devices, especially those for riflescopes and other mechanically adjusted devices, and, more particularly, to adjustment knobs and rotatable adjustment devices having features for reducing or eliminating lost motion due to clearance, backlash, or play in threaded couplings or in other assemblies of such adjustment knobs and devices.

BACKGROUND

Riflescopes and certain other optical devices often include adjustment knobs, also known as turret knobs, which are manually graspable and rotatable about an axis of rotation of the knob to adjust a setting of the riflescope or other optical device, such as an elevation or windage adjustment setting a vertical or horizontal point of aim of the riflescope.

One type of adjustment knob includes a drive screw (or threaded "plunger") that is threadably coupled to a spindle and keyed to a housing (e.g. maintube) of the riflescope so that the drive screw cannot rotate relative to the housing. The spindle is rotatable relative to the housing about an axis of rotation, but is retained against the housing so that it cannot translate along the axis relative to the housing. This arrangement causes rotation of the spindle to be converted into linear movement of the drive screw along the axis, to adjust a movable member within the housing of the riflescope, such as a pivoting erector system. Further details of such adjustment knobs are illustrated and described in U.S. Pat. Nos. 6,279,259; 9,170,068; 9,182,773; and publication No. US 2019/0128642, which are incorporated herein by reference.

While this type of spindle and non-rotating drive screw (plunger) arrangement has many advantages, the present inventor has recognized that it may suffer from lost motion at the limit of its adjustment travel, meaning that terminal rotation of the spindle does not effect a corresponding shift in the point of aim of the riflescope. One of the causes of this is that the drive screw is pushed outwardly by an erector system of the riflescope, into the threaded bore of the spindle, but when the drive screw hits an adjustment stop that limits outward axial movement of the drive screw, the spindle can continue to rotate for some angular amount due to the existence of thread clearance or play between the spindle and the drive screw (also sometimes referred to as "backlash") or other clearances or play in the system. Since the spindle is rotating and the drive screw is no longer translating to match it, a loss of motion (or lost-motion condition) occurs. This lost motion condition is further explained below with reference to FIGS. 1-4.

The present inventor has recognized a need to avoid lost motion at the limit of travel of an adjustment device, and has developed mechanisms for reducing or eliminating lost motion in such adjustment devices.

Additional aspects and advantages will be apparent from the following detailed description of preferred embodiments, which proceeds with reference to the accompanying drawings.

DETAILED DESCRIPTION OF PREFERRED EMBODIMENTS

Figure 1:
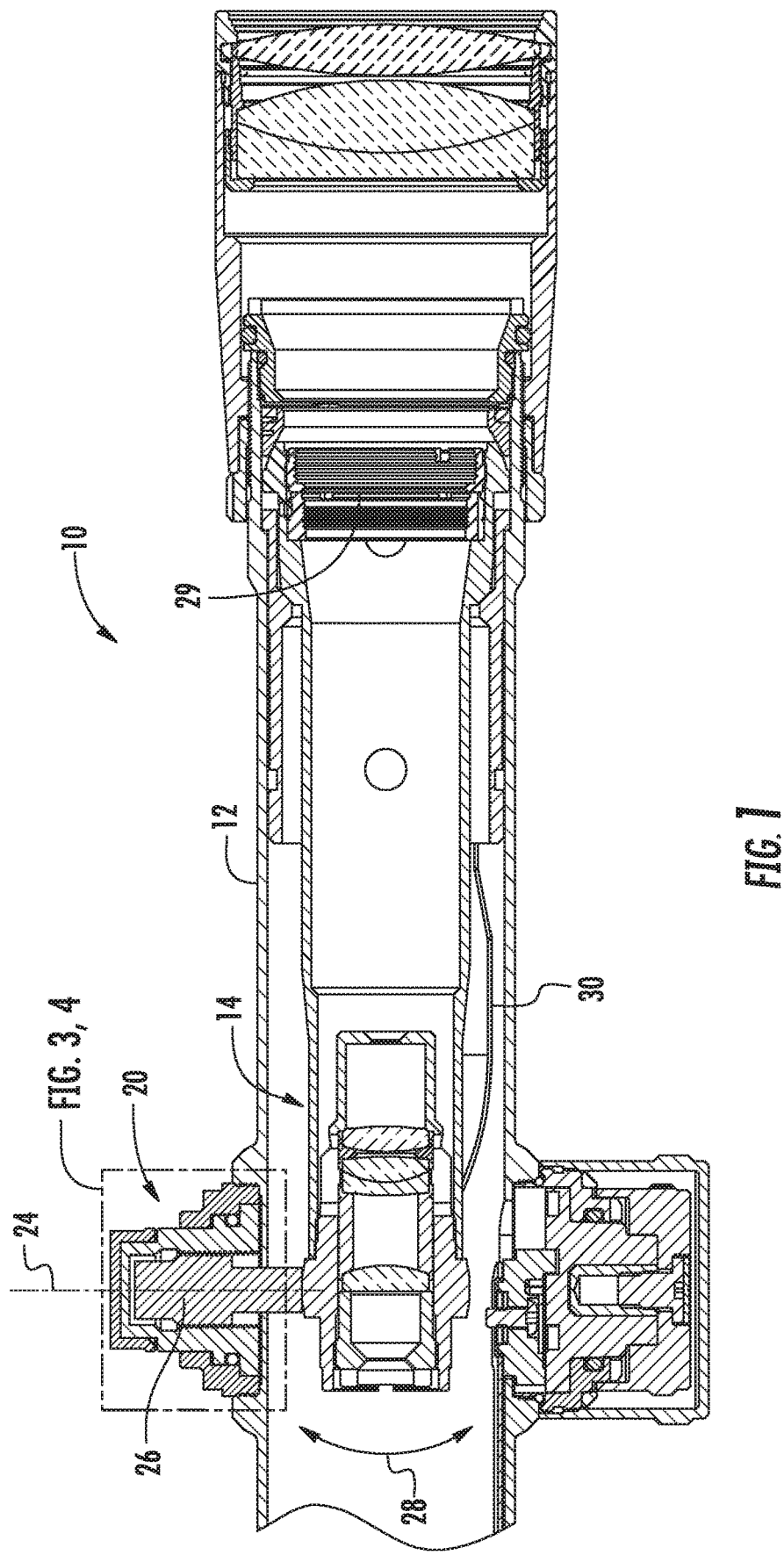
FIG. 1 is a partial cross section view of a riflescope with an adjustment knob called out for detail in FIGS. 3 and 4.

FIG. 1 is a cross section view of a typical riflescope 10 which includes a housing 12 (sometimes referred to as the "maintube"), and an image-inverting erector system 14 pivotably mounted within the housing 12, as is well known in the art. An adjustment knob 20 protrudes from the housing 12 and is rotatable about an axis 24 extending transversely to a longitudinal axis of the housing 12. The adjustment knob 20 includes an adjustment screw (or threaded plunger) 26 that bears against the erector system 14 and is adjustably extendable into the housing 12 to cause pivoting movement of the erector system 14 (illustrated by arrows 28) which effects a point of aim shift either vertically (elevation) or horizontally (windage) depending on the position of the adjustment knob on the housing 12. The shift in the point of aim of riflescope 10 is typically accomplished through cooperation between optical elements within erector system 14 and a reticle 29 within housing 12, as is well known in the art. A spring 30 biases the erector system relative to the housing 12 to press the erector system 14 against the drive screw 26.

Figure 2:
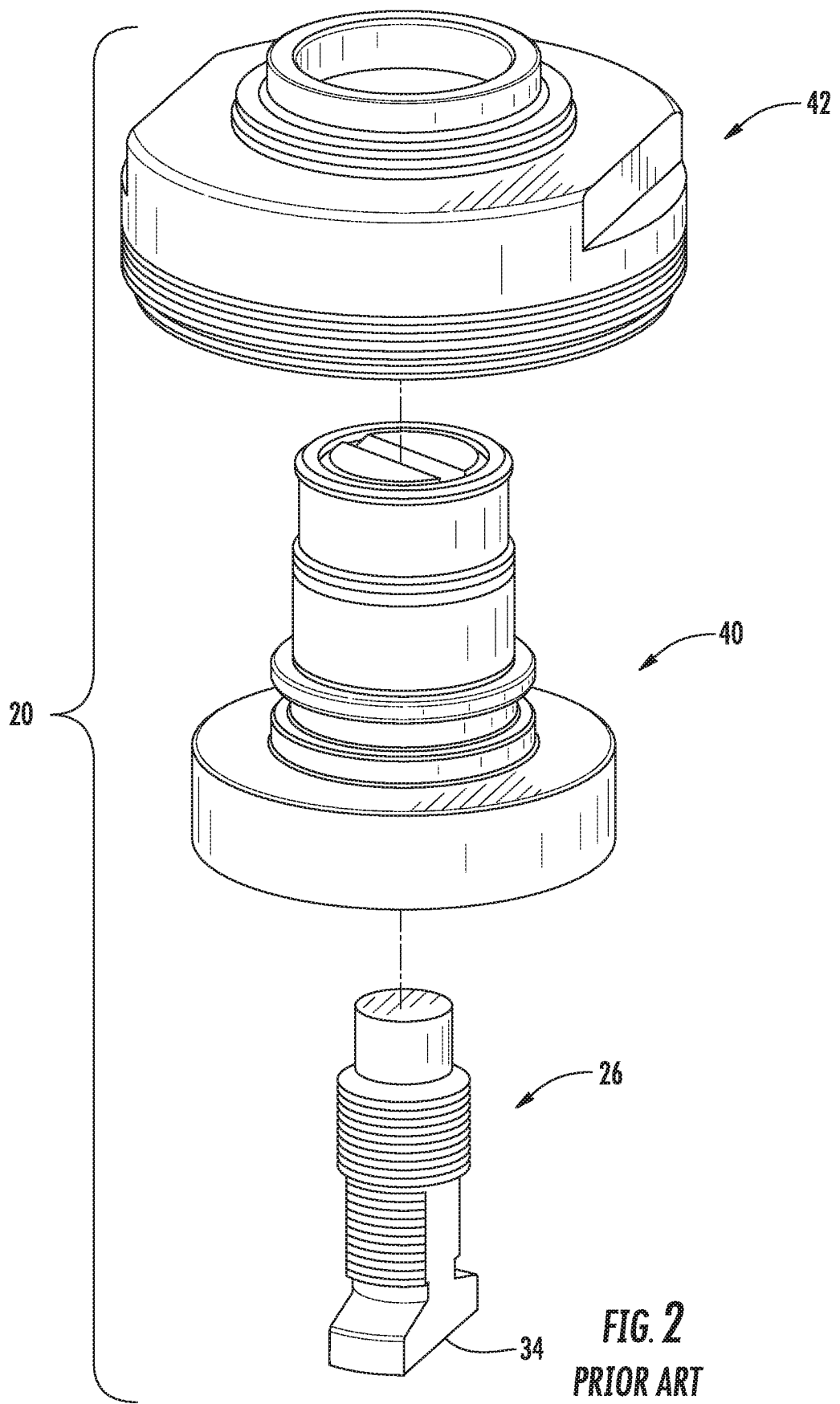
FIG. 2 is an enlarged exploded view of the adjustment knob of FIG. 1 illustrating the prior art.
Figure 3:
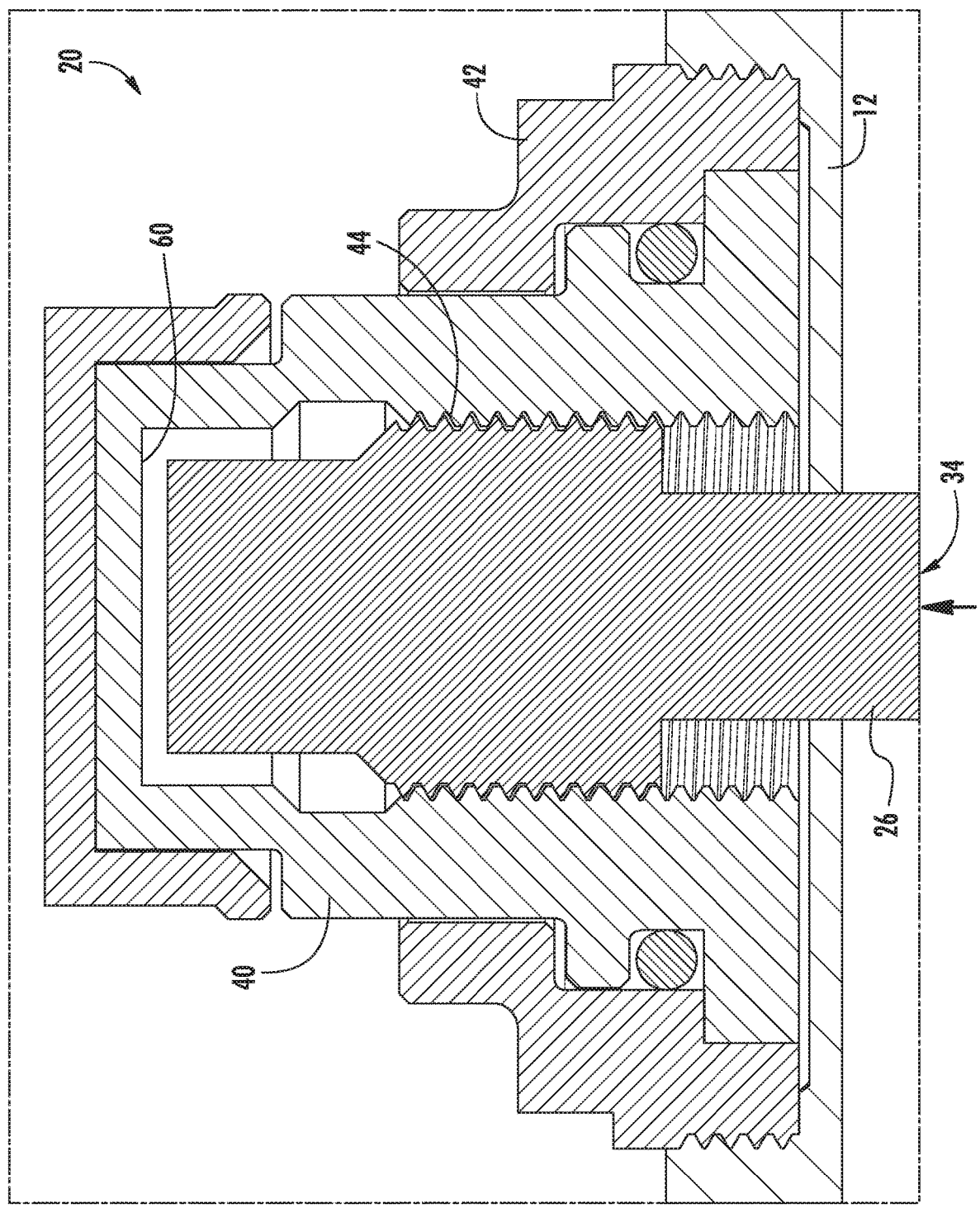
FIG. 3 is an enlarged cross section view of the adjustment knob of FIG. 1, illustrating a drive screw of the adjustment knob in the midst of its range of travel.

FIGS. 2 and 3 show detail of adjustment knob 20 including how the drive screw 26 is threaded into a spindle 40 of the adjustment knob 20, and how the spindle 40 is retained to housing 12 by a flange 42. FIG. 3 illustrates how the drive screw 26 is pushed outwardly (relative to a longitudinal centerline of riflescope 10 extending through the lenses) by the pressure applied by spring 30 (FIG. 1) causing the erector system 14 (FIG. 1) to bear against an inner end 34 of the drive screw 26. This outward pressure or biasing of drive screw 26 causes thread clearance 44 between the threads on the drive screw 26 (hereinafter "drive screw threads") and the threads in the spindle 40 (hereinafter "spindle threads") to be concentrated at an underside of the drive screw threads (the thread clearance is exaggerated in the figures for clarity). The thread clearance 44 remains at the underside of the drive screw threads throughout the majority of the adjustment travel, except when a lost motion condition occurs at a limit of travel, as is illustrated in FIG. 4.

Figure 4:
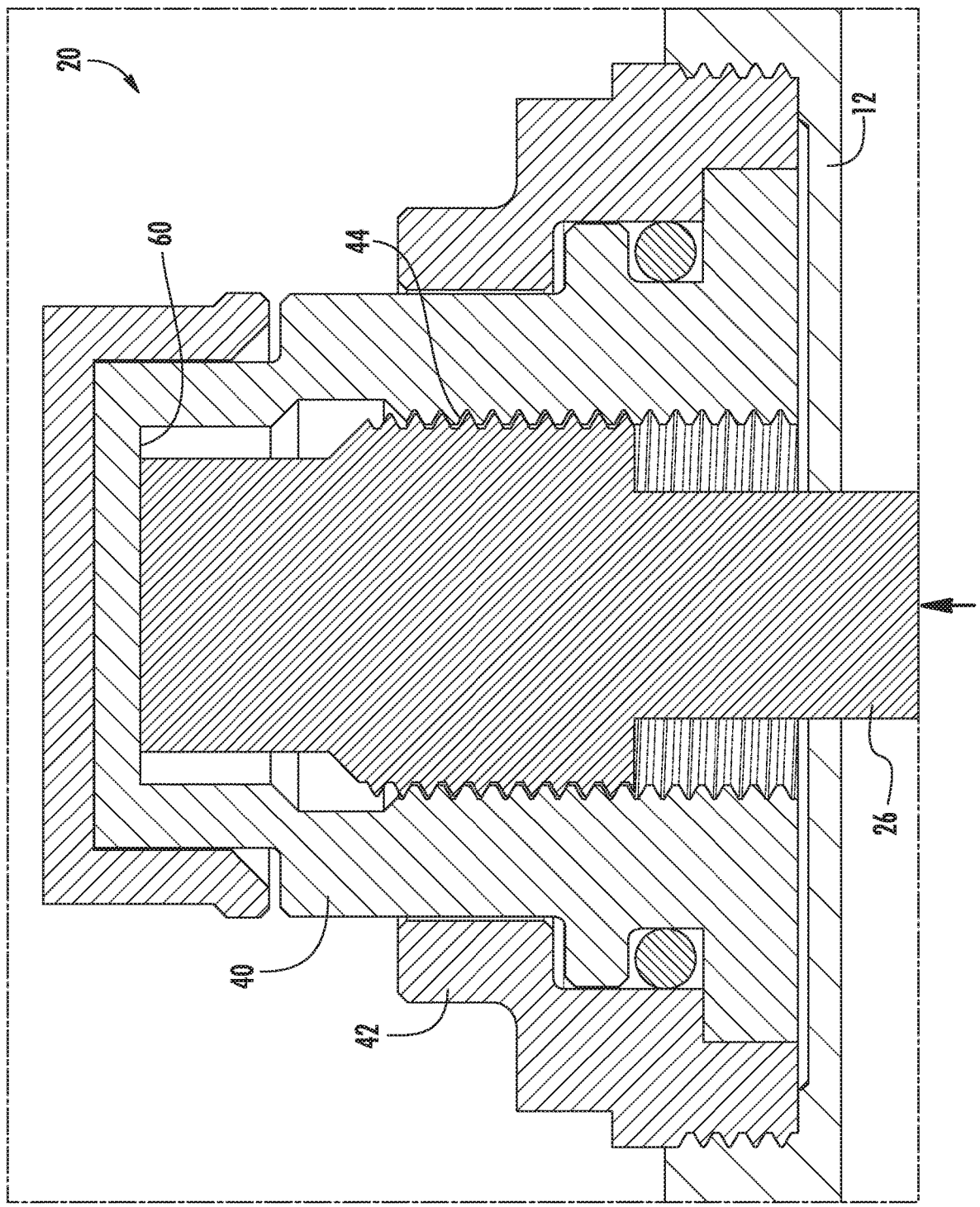
FIG. 4 is an enlarged detail cross section view of the adjustment knob of FIG. 1, showing the drive screw of the adjustment knob adjusted to its limit whereat an end of the drive screw contacts an adjustment stop within a spindle of the adjustment knob.

Turning to FIG. 4, drive screw 26 is illustrated at a limit of its outward travel whereat the drive screw 26 hits an adjustment stop 60, which in this example is the bottom of the threaded bore in spindle 40 into which the drive screw 26 is threaded. At the initial instant of contact between the drive screw 26 and adjustment stop 60, the spindle 40 can continue to rotate until the thread clearance 44 transfers from the underside of the drive screw threads (as illustrated in FIG. 3) to the oppositely facing outer side of the drive screw threads (as illustrated in FIG. 4). This action causes the spindle threads to wedge the drive screw 26 against the adjustment stop 60. During this transition of thread clearance 44 from the underside to the outer side of the drive screw threads, the drive screw 26 is already pressing against the adjustment stop 60, so cannot continue to translate along the axis 24 (FIG. 1) relative to housing 12, even though the spindle 40 has continued to rotate relative to the housing 12. Rotation of the spindle 40 without corresponding translation of the drive screw along axis 24 is a loss of motion (aka lost motion). Once the drive screw 26 is wedged against the adjustment stop 60, an attempt to further rotate the spindle 40 in the same direction will be prevented by the drive screw 26 being keyed to the housing 12.

Mechanisms for reducing or eliminating lost motion in this type of adjustment knob will now be illustrated with reference to FIGS. 5-10 showing two different embodiments of such mechanisms. The mechanisms 100 and 200 of FIGS. 5-10 may be used on riflescopes of the kind illustrated in FIG. 1. Accordingly, reference numerals appearing in FIG. 1 are also referenced below in connection with the description of FIGS. 5-10 to identify like elements, and in some cases common elements are labeled with the same reference numerals as appearing in FIG. 1 without further description.

Figure 5:
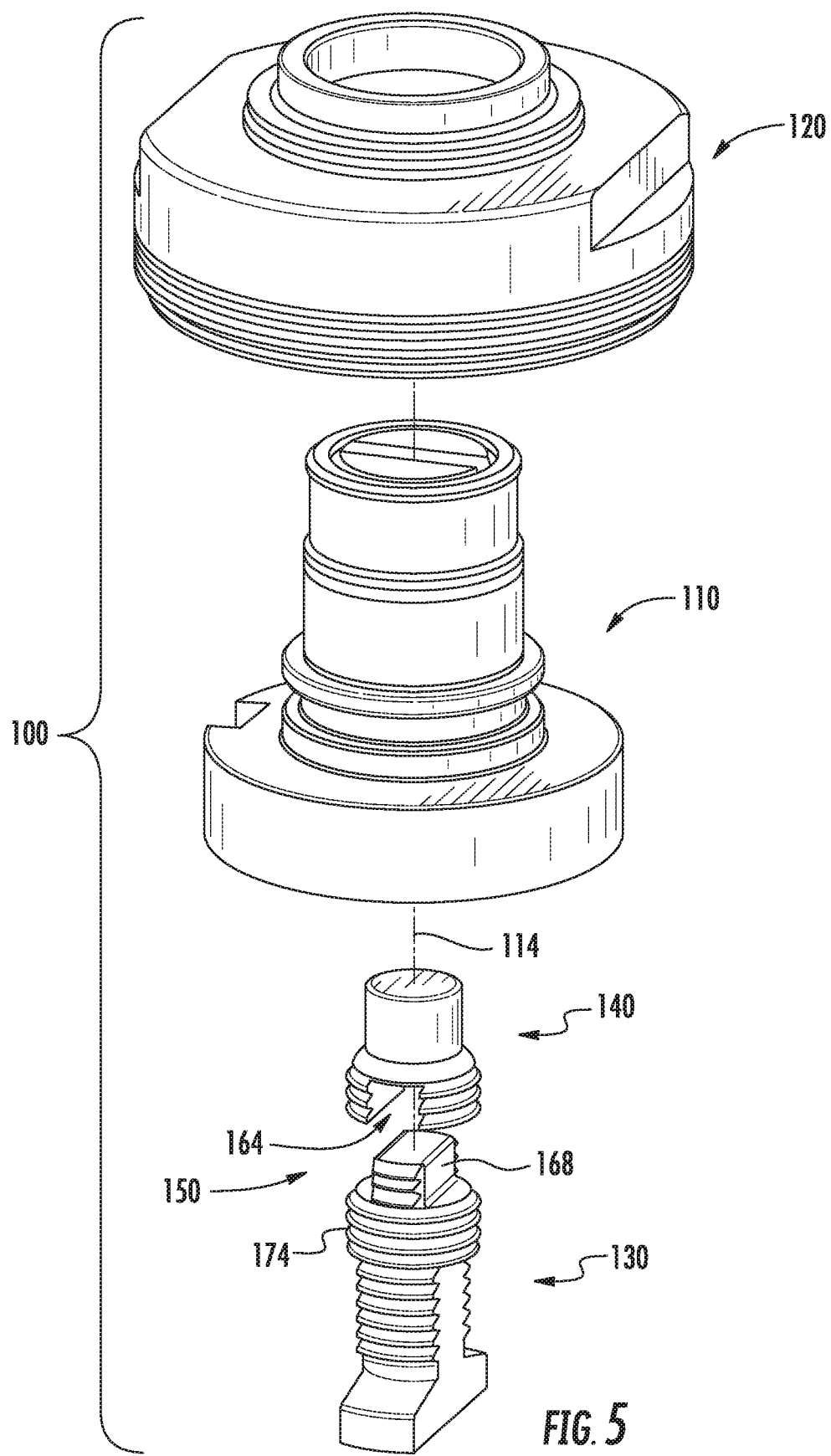
FIG. 5 is an exploded view of an adjustment device according to a first embodiment of the invention.
Figure 6:
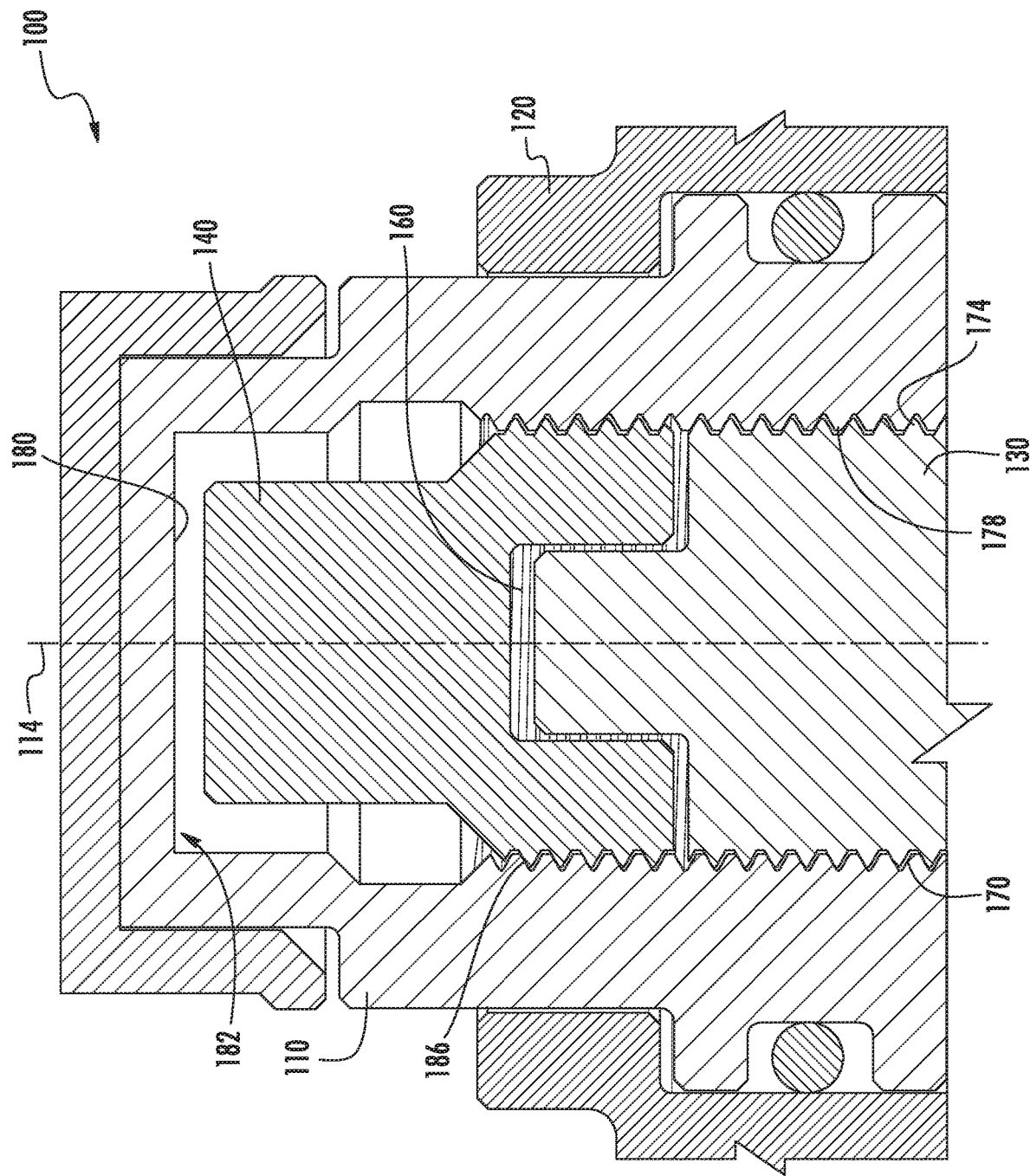
FIG. 6 is an enlarged cross section view of the adjustment device of FIG. 5 showing a drive screw of the adjustment device in the midst of its range of travel.

With reference to FIGS. 5 and 6, a rotatable adjustment device 100 for a riflescope 10 (FIG. 1) or other optical device includes a spindle 110 that is rotatable about an axis 114 (corresponding to axis 24 in FIG. 1) relative to a housing (maintube) 12 (FIG. 1) of riflescope 10. The spindle 110 is captured by a flange 120 which is threaded onto and fixed to housing 12 to constrain axial movement and prevent translation of spindle 110 along axis 114, 24 relative to housing 12. A drive screw 130 is threadably coupled to spindle 110 coaxially therewith. The drive screw 130 is keyed to housing 12 or otherwise constrained to prevent drive screw 130 from rotating about axis 114, so that rotation of the spindle 110 causes drive screw 130 to translate along axis 114 relative to housing 12.

A stop screw 140 is also threadably coupled to spindle 110. Stop screw 140 is constrained to prevent its rotation about axis 114 relative to housing 12, so that stop screw 140 moves along axis 114 in response to rotation of spindle 110. As illustrated in FIG. 6, stop screw 140 and drive screw 130 are installed in spindle 110 such that stop screw 140 and drive screw 130 are keyed together via a tongue-in-groove coupling arrangement 150 (FIG. 5), but leaving a gap 160 along the axis of rotation 114. In the embodiment illustrated, the tongue-in-groove coupling 150 includes a radial slot 164 extending across an inwardly facing end of stop screw 140, and a tongue 168 formed in an outward end of drive screw 130. In other embodiments (not shown), the tongue 168 and groove 164 are reversed. The tongue 168 and groove 164 are slidably mated to constrain rotation of stop screw 140 relative to drive screw 130 and relative to housing 12, while allowing the drive screw 130 to move along axis 114 relative to stop screw 140 (by virtue of gap 160) to thereby inhibit or eliminate lost motion at the limit of adjustment travel, as is described below with reference to FIG. 7. Similar to the illustration of FIG. 3, outward pressure or biasing of drive screw 130 outwardly causes thread clearance 170 (between drive screw threads 174 on drive screw 130 and spindle threads 178 in spindle 40) to be concentrated at an underside of the drive screw threads 174.

In other embodiments (not illustrated), stop screw 140 may be provided in the form of a sleeve located outside of spindle 110 and threadably coupled, directly or indirectly, to spindle 110, but constrained by keying to a fixed, non-rotating part of adjustment device 100 or housing 12 exterior to spindle 110, such as flange 120, instead of keying to drive screw 130, so that the stop screw sleeve does not rotate with spindle 110, but translates along a path that is aligned with axis 114.

Figure 7:
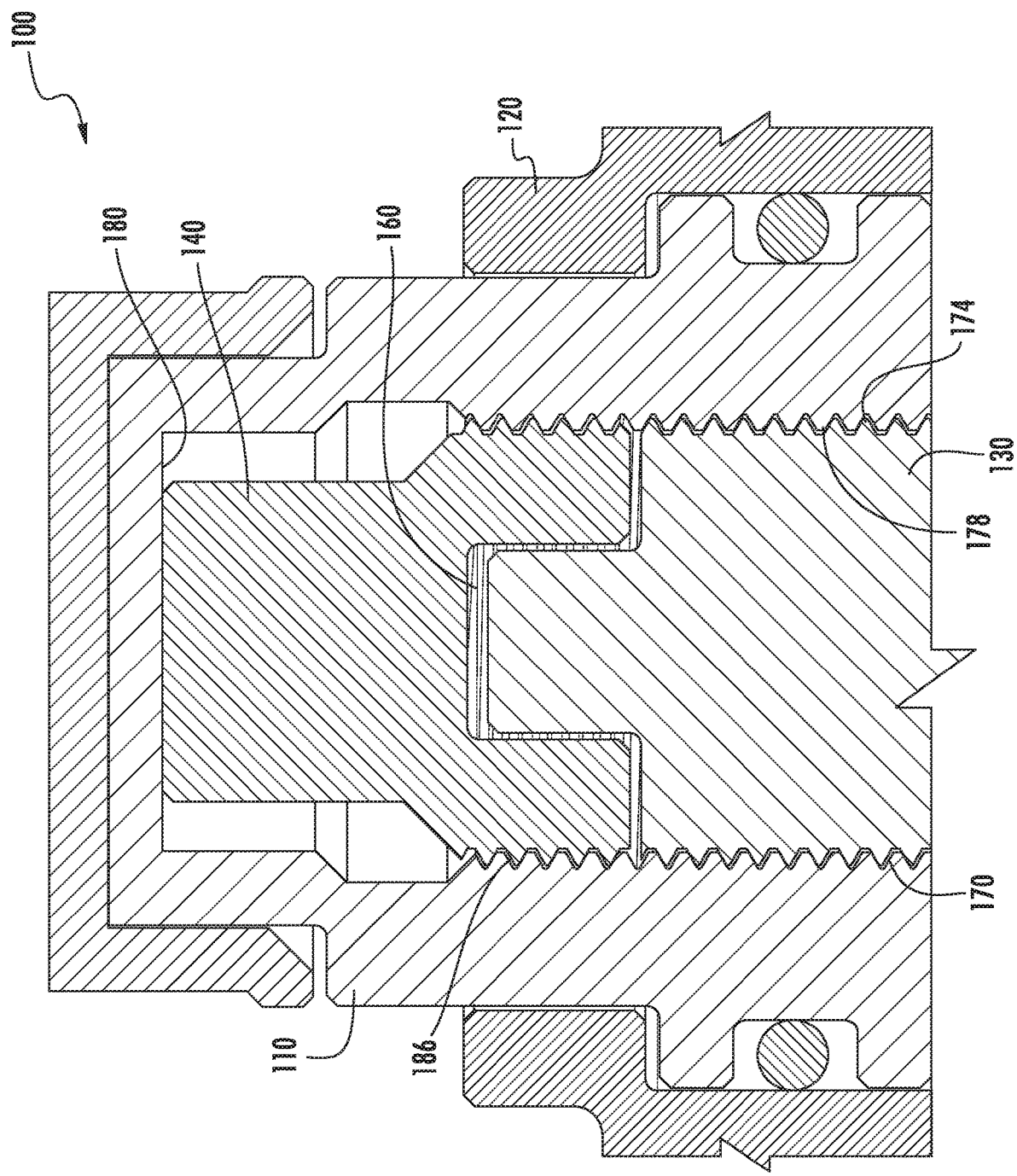
FIG. 7 is an enlarged cross section view of the adjustment device of FIG. 5 showing the adjustment device adjusted to its limit whereat a stop screw contacts an adjustment stop within a spindle of the adjustment device.

With reference to FIGS. 6 and 7, an adjustment stop 180 is located along a path of movement of stop screw 140. Rotation of spindle 110 in a first rotational direction about axis 114 causes stop screw 140 to move along the path of movement in an outward direction until stop screw 140 contacts adjustment stop 180, as shown in FIG. 7, to limit further rotation of spindle 110 in the first rotational direction. In the embodiment illustrated in FIGS. 6 and 7, the adjustment stop 180 is the base of threaded bore 182 within spindle 110 into which the adjustment screw 130 and stop screw 140 are threaded. In other embodiments, the adjustment stop 180 may be located elsewhere, in cooperation with stop screw 140. For example, if stop screw 140 is located outside of spindle 110, as in the alternative embodiment suggested above, then adjustment stop 180 may be located on flange 120, on housing 12, or elsewhere along the path of movement of stop screw 140 (not illustrated), such that stop screw 140 contacts stop 180 at the limit of travel of the adjustment device and prevents further rotation of spindle 110 before drive screw 130 reaches the base of threaded bore 182.

FIG. 7 illustrates adjustment device 100 at the limit of its travel. With reference to FIG. 7, drive screw 130 is biased outwardly so that the thread clearance 170 is along the underside of drive screw threads 174. However, stop screw 140 is wedged by spindle threads 178 because stop screw 140 abuts adjustment stop 180 and therefore cannot travel any further along axis 114. As the thread clearance of stop screw 140 transitions from one face of its threads 186 to the other (i.e., as the spindle continues to rotate) drive screw 130 continues moving along axis 114 in response to the rotation of spindle 110. This small amount of continued rotation of spindle 110 and translation of drive screw 130, when stop screw 140 has stopped translating (due to abutment with adjustment stop 180), results in a slight reduction in the height of gap 160 between drive screw 130 and stop screw 140. Thus, the connection between drive screw 130 and stop screw 140 need merely be compliant in a direction along the axis of rotation, such that the force or pressure applied by spring 30 may change the size of gap 160 at the limit of adjustment, while constraining relative rotation between drive screw 130 and stop screw 140.

By letting the stop screw 140 "absorb" the loss of motion, drive screw 130 is allowed to continue translating and changing the point of aim of riflescope 10 until all motion of the spindle 110 in the first rotational direction is stopped.

Figure 8:
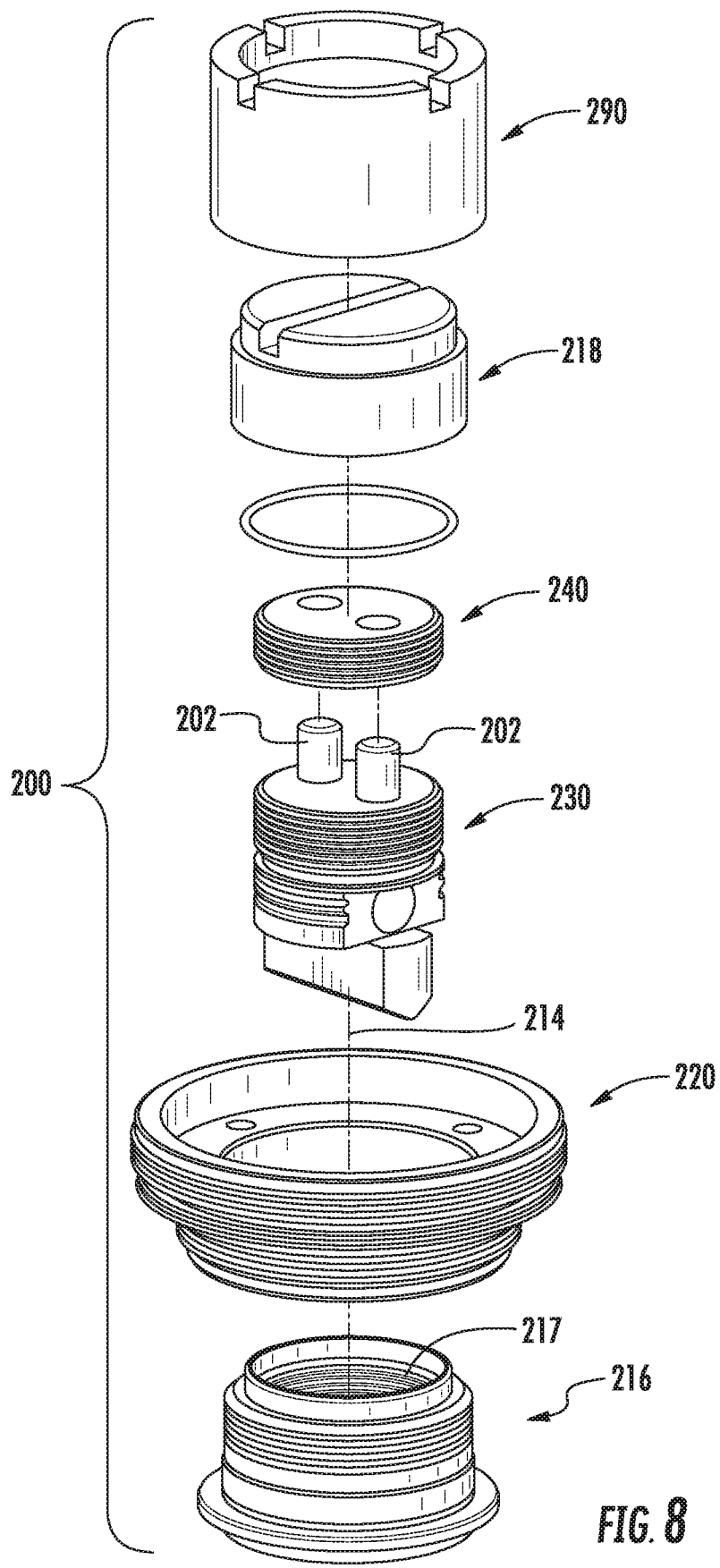
FIG. 8 is an exploded view of an adjustment device according to another embodiment of the invention.
Figure 9:
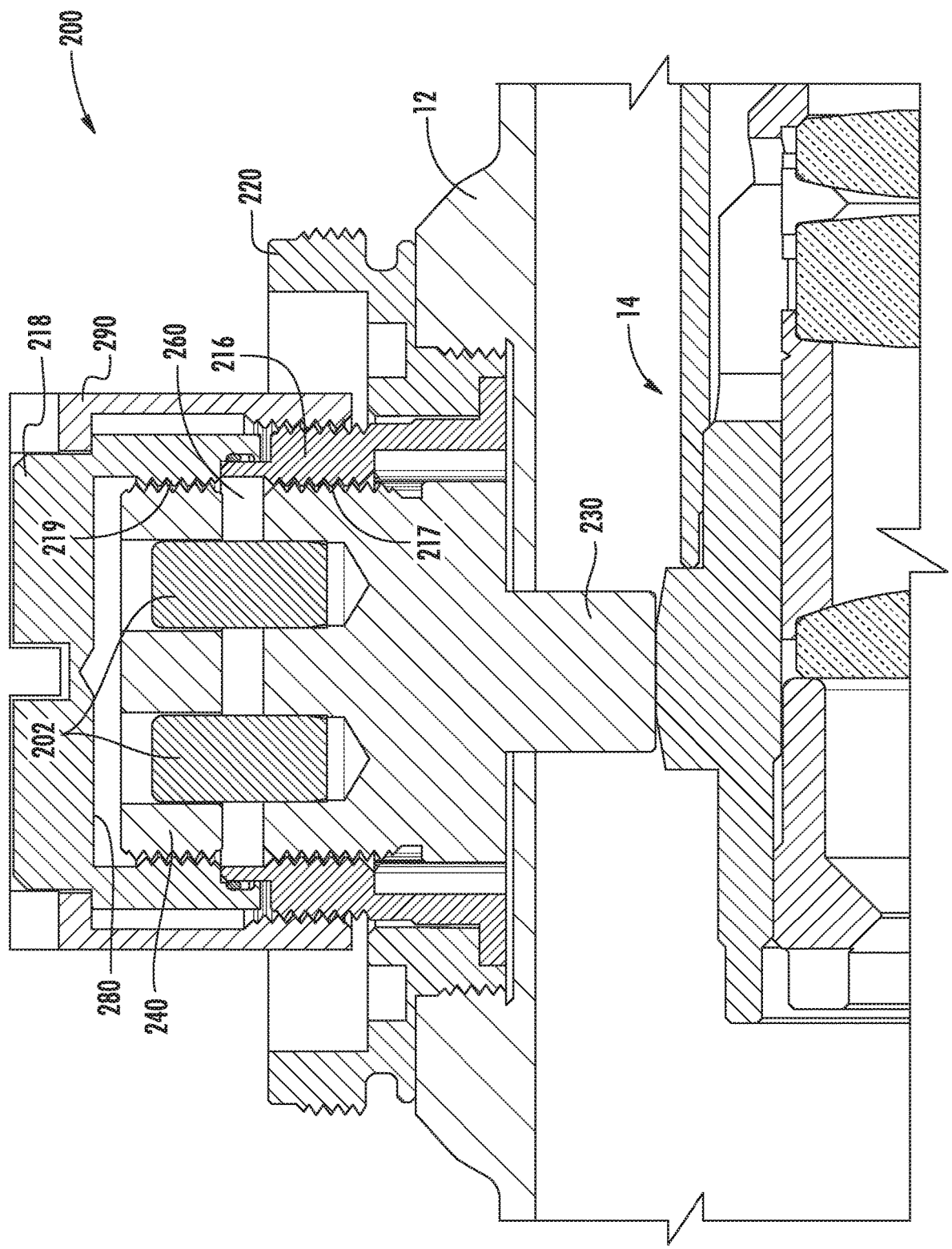
FIG. 9 is an enlarged cross section view of the adjustment device of FIG. 8 showing a drive screw of the adjustment device in the midst of its range of travel.
Figure 10:
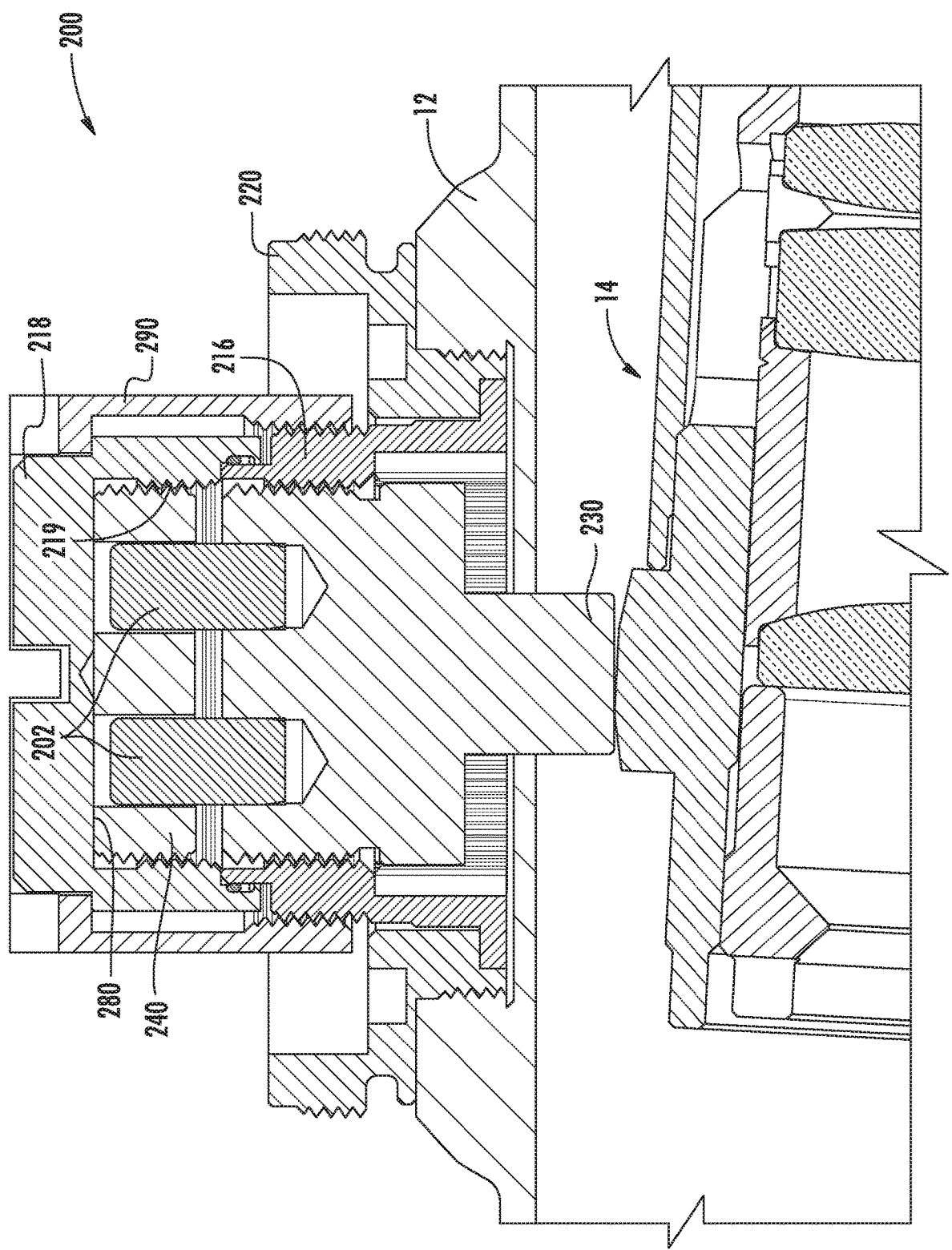
FIG. 10 is an enlarged cross section view of the adjustment device of FIG. 8 showing the adjustment device adjusted to its limit whereat a stop screw contacts an adjustment stop within a spindle of the adjustment device.

FIGS. 8-10 illustrate another embodiment of an adjustment device 200 with a mechanism for reducing or eliminating lost motion. Adjustment device 200 operates in much the same manner as the adjustment device 100 of FIGS. 5-7, in that it involves separating the drive screw plunger into two threaded components, allowing a stop screw portion to "absorb" the additional rotational motion (or lost motion) of the spindle.

With reference to FIGS. 8-10, a pair of guide pins 202 are used to "key" the stop screw 240 together to the drive screw 230 to prevent relative rotation therebetween about axis 214, while allowing relative motion therebetween along the axis 214. The spindle comprises an assembly of two or more parts, including a spindle body 216 having a first set of internal threads 217 into which drive screw 230 is threaded, and a spindle cap 218 attached to spindle body 216 and having a second set of internal threads 219 (FIG. 9) into which stop screw 240 is threaded. The first and second sets of internal threads 217, 219 may have the same pitch or may have different pitches—the latter arrangement resulting in differential rates of motion of the drive screw 230 and stop screw 240 along axis 214, which will cause the size of gap 260 to change along the range of adjustment, which may allow a reduction in the overall height of adjustment device 200. Spindle body 216 is retained to housing 12 by flange 220. By having a spindle cap 218 on top of the spindle body 216, the gap 260 between the drive screw 230 and stop screw 240 can be adjusted. This adjustment controls how much loss of motion can be accommodated by the adjustment device 200. The multi-part construction of the spindle 216, 218 also facilitates assembly of the adjustment device 200. A locknut 290 is used to hold the spindle assembly 216, 218 together and to maintain the gap setting.

FIG. 10 illustrates the adjustment device 200 at the end of its travel—and resultant pivoting of erector system 14. With reference to FIG. 10, stop screw 240 has reached adjustment stop 280 in spindle cap 218 and any additional rotation of spindle assembly 216, 218 is transferred to the guide pins 202 which will bind with the stop screw 240 and cease additional unwanted rotation of the spindle assembly.

While lost motion and various mechanisms for counteracting it have been illustrated above with reference to adjustment knobs for riflescopes, it should be understood that adjustment devices according to the principles of the present disclosure may be useful in connection with a variety of other optical devices, such as spotting scopes, microscopes, telescopes, and with other mechanically adjustable devices requiring precise motion control.

It will be obvious to those having skill in the art that many changes may be made to the details of the above-described embodiments without departing from the underlying principles of the invention. The scope of the present invention should, therefore, be determined only by the following claims.

The invention claimed is:

1. A rotatable adjustment device for a riflescope or other optical device, comprising:
a spindle that is rotatable about an axis and constrained to prevent translation of the spindle along the axis;
a drive screw threadably coupled to the spindle coaxially therewith, the drive screw being constrained to prevent the drive screw from rotating about the axis so that rotation of the spindle causes the drive screw to translate along the axis;
a stop screw threadably coupled to the spindle, the stop screw constrained to prevent rotation of the stop screw about the axis so that the stop screw moves along the axis in response to rotation of the spindle, the stop screw and the drive screw arranged to leave a gap therebetween; and
an adjustment stop located along a path of movement of the stop screw, rotation of the spindle in a first rotational direction about the axis causing movement of the stop screw along the axis in a first direction until the stop screw contacts the adjustment stop to limit further rotation of the spindle in the first rotational direction.

2. The rotatable adjustment device of claim 1, wherein the stop screw is keyed to the drive screw to prevent the stop screw from rotating about the axis while allowing the drive screw to move along the axis relative to the stop screw to thereby inhibit lost motion in the adjustment device.

3. The rotatable adjustment device of claim 2, wherein the stop screw is keyed to the drive screw via a tongue and groove arrangement.

4. The rotatable adjustment device of claim 2, further comprising a pair of guide pins keying the stop screw to the drive screw to prevent relative rotation therebetween about the axis.

5. The rotatable adjustment device of claim 1, wherein the drive screw is biased in the first direction.

6. The rotatable adjustment device of claim 2, wherein:
the spindle includes:
a spindle body having a first set of threads into which the drive screw is threaded, and
a spindle cap having a second set of threads into which the stop screw is threaded; and
further comprising a locknut securing the spindle cap to the spindle body.

7. A riflescope including the rotatable adjustment device of claim 1, the riflescope including:
a maintube; and
a flange fixed to the maintube, the spindle being captured by the flange to prevent the spindle from moving along the axis relative to the maintube, while allowing rotation of the spindle about the axis relative to the maintube.

8. The riflescope of claim 7, further comprising an erector system movably mounted within the maintube, and the drive screw contacting the erector system to displace the erector system in response to rotation of the spindle.

9. The riflescope of claim 7, further comprising an erector system movably mounted within the maintube and pushing against the drive screw.

10. The riflescope of claim 9, further comprising a spring, the spring biasing the erector system against the drive screw.

11. The riflescope of claim 10, further comprising a reticle within the maintube; and
in response to rotation of the spindle, the drive screw moves along the axis and displaces the erector system to shift a point of aim of the riflescope.

12. A riflescope, comprising
a housing,
an erector system pivotably mounted within the housing, and
an adjustment knob protruding from the housing, the adjustment knob including:
a rotatable spindle;

a flange fixed to the housing and rotatably retaining the spindle to the housing to allow the spindle to be rotated relative to the housing about an axis of rotation while the flange constrains the spindle from translating along the axis relative to the housing;

a drive screw threadably coupled to the spindle, the drive screw being keyed to the housing to prevent the drive screw from rotating about the axis relative to the housing, so that rotation of the spindle about the axis relative to the housing causes the drive screw to translate along the axis relative to the housing, the drive screw contacting the erector system to displace the erector system in response to rotation of the spindle;

a stop screw threadably coupled to the spindle, the stop screw constrained to prevent rotation of the stop screw relative to the housing so that rotation of the spindle causes the stop screw to move relative to the housing along a path aligned with the axis, the stop screw and the drive screw arranged to leave a gap therebetween; and an adjustment stop located along the path of the stop screw, the stop screw movable along the path toward the adjustment stop in response to rotation of the spindle in a first rotational direction until the stop screw contacts the adjustment stop to limit further rotation of the spindle in the first rotational direction.

13. The riflescope of claim 12, wherein the housing comprises a maintube.

14. The riflescope of claim 12, wherein the stop screw is keyed to the drive screw to prevent the stop screw from rotating about the axis relative to the housing while allowing the drive screw to move along the axis relative to the stop screw to thereby inhibit lost motion in the adjustment knob.

15. The riflescope of claim 14, wherein the stop screw is keyed to the drive screw via a tongue and groove arrangement.

16. The riflescope of claim 14, further comprising a pair of guide pins keying the stop screw to the drive screw to prevent relative rotation therebetween about the axis.

17. The riflescope of claim 14, wherein:
the spindle includes:
a spindle body having a first set of threads into which the drive screw is threaded, and
a spindle cap having a second set of threads into which the stop screw is threaded; and
further comprising a locknut securing the spindle cap to the spindle body.

18. The riflescope of claim 12, further comprising a spring biasing the erector system relative to the housing to press against an end of the drive screw that extends into the housing.

19. The riflescope of claim 12, further comprising a reticle within the housing.

* * * * *